(12) United States Patent
Li (10) Patent No.: US 10,841,259 B2
(45) Date of Patent: Nov. 17, 2020

(54) METHOD AND APPARATUS FOR GENERATING AND APPLYING HOMEPAGE ID NUMBER

(71) Applicant: Shiwei Li, Shatin (HK)

(72) Inventor: Shiwei Li, Shatin (HK)

( * ) Notice: Subject to any disclaimer, the term of this patent is extended or adjusted under 35 U.S.C. 154(b) by 210 days.

(21) Appl. No.: 16/137,784

(22) Filed: Sep. 21, 2018

(65) Prior Publication Data

US 2019/0325117 A1 Oct. 24, 2019

Related U.S. Application Data

(60) Provisional application No. 62/659,262, filed on Apr. 18, 2018, provisional application No. 62/659,268, (Continued)

(30) Foreign Application Priority Data

| Jun. 13, 2018 | (CN) | 2018 1 0608658 |
| Jun. 13, 2018 | (CN) | 2018 1 0608659 |
| Jun. 13, 2018 | (CN) | 2018 1 0608671 |
| Jun. 13, 2018 | (CN) | 2018 1 0610187 |
| Jun. 13, 2018 | (CN) | 2018 1 0610189 |
| Jun. 13, 2018 | (CN) | 2018 1 0611025 |
| Jun. 13, 2018 | (CN) | 2018 1 0611056 |

(51) Int. Cl.
*G06F 21/00* (2013.01)
*H04L 12/58* (2006.01)
(Continued)

(52) U.S. Cl.
CPC .......... *H04L 51/046* (2013.01); *G06F 3/0481* (2013.01); *G06F 3/0483* (2013.01); *G06F 3/04817* (2013.01); *G06F 3/04845* (2013.01);

*G06F 16/2246* (2019.01); *G06F 16/248* (2019.01); *G06F 16/9027* (2019.01); *G06F 16/954* (2019.01); *G06F 16/958* (2019.01); *G06F 16/9535* (2019.01);
(Continued)

(58) Field of Classification Search
CPC ... H04L 63/102; H04L 63/0876; H04L 63/08; H04L 63/0869; H04L 2209/805; H04L 9/3226; H04L 9/3231
See application file for complete search history.

(56) References Cited

U.S. PATENT DOCUMENTS

| 2014/0282943 A1* | 9/2014 | Nikankin | H04L 63/0884 726/6 |
| 2016/0086513 A1* | 3/2016 | Uejima | H04L 67/12 434/201 |

* cited by examiner

*Primary Examiner* — Ghazal B Shehni
(74) *Attorney, Agent, or Firm* — Locke Lord LLP; Tim Tingkang Xia, Esq.

(57) ABSTRACT

The invention relates to method and apparatus for generating and applying a homepage ID number used as user identification of a user in a homepage system. The method includes obtaining a homepage ID number generation class; when the homepage ID number generation class is a user-type-based generation manner, obtaining a user type of a user, and searching for a matching first number segment according to the user type; receiving a second number segment input by the user, or displaying multiple second number segments for the user to select from and receiving a second number segment determined by the user; generating, according to the first number segment and the second number segment input or selected by the user, a homepage ID number for identifying user identity of the user.

10 Claims, 6 Drawing Sheets

Related U.S. Application Data filed on Apr. 18, 2018, provisional application No. 62/659,274, filed on Apr. 18, 2018, provisional application No. 62/659,279, filed on Apr. 18, 2018, provisional application No. 62/659,285, filed on Apr. 18, 2018, provisional application No. 62/659,289, filed on Apr. 18, 2018, provisional application No. 62/659,292, filed on Apr. 18, 2018, provisional application No. 62/659,297, filed on Apr. 18, 2018.

(51) Int. Cl.
| | | |
|---|---|---|
| *G06F 3/0481* | (2013.01) | |
| *H04N 7/14* | (2006.01) | |
| *G06F 3/0484* | (2013.01) | |
| *G06F 16/22* | (2019.01) | |
| *G06F 16/9535* | (2019.01) | |
| *G06F 16/954* | (2019.01) | |
| *G06F 3/0483* | (2013.01) | |
| *G06F 16/958* | (2019.01) | |
| *G06F 16/901* | (2019.01) | |
| *G06F 21/31* | (2013.01) | |
| *G06F 21/44* | (2013.01) | |
| *G06F 16/248* | (2019.01) | |
| *G06Q 10/08* | (2012.01) | |
| *H04L 29/08* | (2006.01) | |
| *H04L 29/06* | (2006.01) | |

(52) U.S. Cl.
CPC ............. *G06F 21/31* (2013.01); *G06F 21/44* (2013.01); *G06Q 10/083* (2013.01); *H04L 51/04* (2013.01); *H04L 51/28* (2013.01); *H04L 51/32* (2013.01); *H04L 51/36* (2013.01); *H04L 67/02* (2013.01); *H04L 67/16* (2013.01); *H04N 7/141* (2013.01); *H04N 7/147* (2013.01); *G06F 2203/04803* (2013.01); *H04L 67/42* (2013.01)

METHOD AND APPARATUS FOR GENERATING AND APPLYING HOMEPAGE ID NUMBER

CROSS-REFERENCE TO RELATED PATENT APPLICATIONS

This application claims priority to and the benefit of, pursuant to 35 U.S.C. § 119(e), U.S. Provisional Patent Application Nos. 62/659,262, 62/659,268, 62/659,274, 62/659,279, 62/659,285, 62/659,289, 62/659,292, and 62/659,297, all filed Apr. 18, 2018, which are incorporated herein in their entireties by reference.

This application also claims priority to and the benefit of, pursuant to 35 U.S.C. § 119(a), Chinese Patent Application Nos. 201810610187.5, 201810608659.3, 201810608671.4, 201810611056.9, 201810611025.3, 201810608658.9, and 201810610189.4, all filed Jun. 13, 2018, in the State Intellectual Property Office of P.R. China, which are incorporated herein in their entireties by reference.

FIELD OF THE INVENTION

The invention relates generally to the technical field of information processing, and more particularly to a method and an apparatus for generating and applying a homepage ID number.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

Nowadays, user numbers have been widely applied to identification in security, finance, and communications systems, for example, banking and telephone systems, whereas the public still use user names in social networks generally. However, if a social network is combined with a collective communication scheme including internet telephony and instant messaging, it is inconvenient to use user names when starting voice/video real-time communication or the like. Therefore, how to provide an ID number for identifying user identity and applicable to social networks is an urgent problem to be resolved.

SUMMARY OF THE INVENTION

Accordingly, an objective of the invention is to provide a method and an apparatus for generating and applying a homepage ID number, so as to resolve the foregoing problems.

In one aspect of the invention, the method for generating and applying a homepage ID number used as user identification of a user in a homepage system. The method is applied to an electronic device comprising an interaction platform including the homepage system, and includes obtaining a homepage ID number generation class, the homepage ID number generation class including a user-type-based generation manner, an existing-number-based number generation manner and a time-period-based generation manner; when the homepage ID number generation class is the user-type-based generation manner, obtaining a user type of a homepage ID number registration user, and searching for a first number segment matching the user type from multiple pre-stored first number segments according to the user type; receiving a second number segment that is input by the user and includes multiple numeric characters, or displaying multiple second number segments for the user to select from and receiving a second number segment determined from the multiple second number segments by the user; and generating, according to the first number segment and the second number segment input or selected by the user, a homepage ID number for identifying user identity of the user.

In one embodiment, the method further includes when the homepage ID number generation class is the existing-number-based number generation manner, obtaining an existing number input by the homepage ID number registration user; and generating an insertion value, and inserting the insertion value at a specified position of the existing number to generate the homepage ID number for identifying the user identity of the user.

In one embodiment, multiple ID number configuration ranges are pre-stored in the electronic device, and the method further includes when the homepage ID number generation class is the time-period-based generation manner, obtaining a current time period of homepage ID number registration, and counting the quantity of users who have finished homepage ID number registration till the current time period, so as to obtain a registration serial number of the homepage ID number registration user; and obtaining an ID number configuration range to which the registration serial number belongs, and obtaining a first number segment corresponding to the ID number configuration range.

In one embodiment, the insertion value includes multiple digits, and the step of inserting the insertion value at a specified position of the existing number to generate the homepage ID number for identifying the user identity of the user includes setting one or more specified positions in the obtained existing number; when there is one specified position, inserting all the digits of the insertion value into the specified position; and when there are multiple specified positions, inserting the digits of the insertion value into the multiple specified positions in a distributive manner.

In one embodiment, the user type includes a public user type, a college graduate user type, and an institutional user type, and when the user type is the institutional user type and the user is in a user institution of a tree-like structure, the method further includes: obtaining, according to the generated homepage ID number, a group of ID number group at least including the homepage ID number; and assigning the ID number group to the user.

In one embodiment, when the ID number group owned by the user includes multiple homepage ID numbers, the method further includes creating a subordinate user of the user based on the tree-like structure; and determining a to-be-assigned homepage ID number from the multiple homepage ID numbers in the ID number group according to a preset rule, and assigning the to-be-assigned homepage ID number to the created subordinate user.

In one embodiment, before the step of generating, according to the first number segment and the second number segment input or selected by the user, a homepage ID number for identifying user identity of the user, the method further includes detecting whether the second number segment input or selected by the user matches a preset particular number segment; if yes, obtaining fee information according to the second number segment and displaying the fee information; and after determining that the user completes a payment operation according to the fee information, performing the step of generating, according to the first number segment and the second number segment input or selected by the user, a homepage ID number for identifying user identity of the user.

In one embodiment, after the step of generating, according to the first number segment and the second number segment input or selected by the user, a homepage ID number for identifying user identity of the user, the method further includes generating an e-mail address of the user according to the generated homepage ID number and preset domain name information, and assigning the generated e-mail address to the user.

In one embodiment, the homepage system includes multiple users, and the method further includes redirecting to a dial interface when an interaction instruction of the user with respect to another user in the homepage system is received; receiving a homepage ID number of the another user and an interaction form that are input by the user in the dial interface, where the interaction form includes a voice call and a video call; and establishing interaction communication between the user and the another user according to the homepage ID number and the interaction form.

In another aspect of the invention, the apparatus for generating and applying a homepage ID number used as user identification of a user in a homepage system. The apparatus is adapted to implement the above method in an electronic device comprising an interaction platform including the homepage system, and includes a generation class obtaining module, configured to obtain a homepage ID number generation class, the homepage ID number generation class including a user-type-based generation manner, an existing-number-based number generation manner and a time-period-based generation manner; a user type obtaining module, configured to: when the homepage ID number generation class is the user-type-based generation manner, obtain a user type of a homepage ID number registration user, and search for a first number segment matching the user type from multiple pre-stored first number segments according to the user type; a number segment obtaining module, configured to receive a second number segment that is input by the user and includes multiple numeric characters, or display multiple second number segments for the user to select from and receive a second number segment determined from the multiple second number segments by the user; and a homepage ID number generation module, configured to generate, according to the first number segment and the second number segment input or selected by the user, a homepage ID number for identifying user identity of the user.

In the method and apparatus for generating and applying a homepage ID number provided in the invention, a homepage ID number generation class is obtained; when the homepage ID number generation class is a user-type-based generation manner, a user type of a homepage ID number registration user is obtained, and a corresponding first number segment is searched for in multiple pre-stored first number segments according to the user type. Then a second number segment is obtained according to information input or selected by the user; a homepage ID number for identifying user identity of the user in the homepage system is generated according to the first number segment and the second number segment. The solution for generating and applying a homepage ID number provides a homepage ID number that can identify user identity of a user, and the homepage ID number is used as a basis for interaction between users in the homepage system, so that the interaction in the platform is more convenient.

In yet another aspect, the invention also provides a non-transitory computer-readable storage medium storing instruction codes. The instruction codes, when executed by one or more processors, control the apparatus to perform the above method for generating and applying a homepage ID number used as user identification of a user in a homepage system.

To make the foregoing objectives, features and advantages of the present invention easier to understand, these and other aspects of the present invention will become apparent from the following description of the preferred embodiments, taken in conjunction with the following drawings, although variations and modifications therein may be affected without departing from the spirit and scope of the novel concepts of the disclosure.

BRIEF DESCRIPTION OF THE DRAWINGS

To describe the technical solutions of the embodiments of the present invention more clearly, the following briefly introduces the accompanying drawings required for describing the embodiments. It should be understood that the accompanying drawings in the following show only some embodiments of the present invention and should not be construed as a limitation to the scope. A person of ordinary skill in the art may still derive other drawings from these accompanying drawings without creative efforts.

Listing of reference numerals: 100, electronic device; 110, processor; 120, main memory; 130, apparatus for generating and applying a homepage ID number; 131, generation class obtaining module; 132, user type obtaining module; 133, number segment obtaining module; 134, homepage ID number generation module; 140, ROM; 150, communication adapter; 160, storage device; 105, bus; 125, display; 135, input device; and 145, communications network.

DETAILED DESCRIPTION OF THE INVENTION

The invention will now be described more fully hereinafter with reference to the accompanying drawings, in which exemplary embodiments of the invention are shown. The invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting and/or capital letters has no influence on the scope and meaning of a term; the scope and meaning of a term are the same, in the same context, whether or not it is highlighted and/or in capital letters. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and in no way limits the scope and meaning of the invention or of any exemplified term. Likewise, the invention is not limited to various embodiments given in this specification.

The terminology used herein is for the purpose of describing particular embodiments only and is not intended to be limiting of the invention. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below can be termed a second element, component, region, layer or section without departing from the teachings of the invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation shown in the figures. For example, if the device in one of the figures is turned over, elements described as being on the "lower" side of other elements would then be oriented on the "upper" sides of the other elements. The exemplary term "lower" can, therefore, encompass both an orientation of lower and upper, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprise(s)" and/or "comprising," or "include(s)" and/or "including" or "has (have)" and/or "having" or "contain(s)" and/or "containing" when used in this specification specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which the invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

As used herein, the phrase at least one of A, B, and C should be construed to mean a logical (A or B or C), using a non-exclusive logical OR. As used herein, the term "and/or" includes any and all combinations of one or more of the associated listed items.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The terms "chip" or "computer chip", as used herein, generally refer to a hardware electronic component, and may refer to or include a small electronic circuit unit, also known as an integrated circuit (IC), or a combination of electronic circuits or ICs.

As used herein, the term "server" generally refers to a system (e.g., a social network server) that responds to requests across a computer network to provide, or help to provide, network services, e.g., network data storage and database management. A server may also include one or more processors to execute computer programs in parallel. An implementation of the server may include software and suitable computer hardware. A server may run on a computing device or a network computer. In some cases, a computer may provide several services and have multiple servers running.

The terms "client" or "client terminal", or "terminal", as used herein, refer to any appropriate user terminal with certain computing capabilities, e.g., a personal computer (PC), a work station computer, a hand-held computing device (e.g., a tablet), a mobile terminal (e.g., a mobile phone or a smart phone), or any other user-side computing devices.

The terms "homepage identification number" or "homepage ID number", as used herein, refer to a user identification containing a set of multiple digital numbers assigned to a user of a homepage system such as a social network or communication system on internet, and used as the identification for easy user calling, recognition and login to the homepage system, which numbers are designed such that they are convenient for users to designate or choose and to remember, they can be one-to-one converted from multiple digital phone numbers of a user, or numbers at the user's choice, or numbers assigned by the homepage system, or based on other rules.

The invention in one aspect relates to methods, apparatuses, and/or electronic devices for generating and applying a homepage ID number. One of ordinary skill in the art would appreciate that, unless otherwise indicated, certain computer systems and/or components thereof may be implemented in, but not limited to, the forms of software, firmware or hardware components, or a combination thereof.

The apparatuses, systems, and/or methods may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The apparatuses, systems, and/or methods may be illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

Traditionally, user numbers have been widely applied to identification in security, finance, and communications systems such as banking and telephone systems. They are less frequently used in social networks as usernames are considered convenient and commonly recognized for people in the social public. When a social network is integrated with popular communication means including internet phone calling and messaging, however, usernames can be less convenient for initiating communication especially on mobile devices, since people have long been used to dialing on a numerical keypad. The mind is habitually set to "dialing numbers" but not "dialing names" which feels indirect. Numbers, when properly designed, are also well suited for memorization thanks to decades of memory adaptation to the "phone numbers" attached to individuals and organizations in the society, and such number-oriented memory may help search, recall, matching or recognizing users in a network, as well as login to a network. Apparently, improvement can be made to a social network with internet phone system by adding a convenient set of user numbers as login and calling identifications. In the design of such numbers, user-friendly considerations should be made on the ease at which people choose, designate and remember the numbers, and it is better to have the adaptability for network expansion built in.

One of the objectives of the invention is to solve the foregoing problems by providing method and apparatus for generating and applying a homepage ID number. As used in the disclosure, the homepage ID number is a user identification (ID) number assigned to a user of a homepage system having an interaction platform, such as a social network or communication system on internet, for easy user calling, recognition and login to the homepage system. The homepage ID number contains a set of multiple digital numbers designed such that they are convenient for users to designate or choose and to remember. The homepage ID number, or exchangeably the user ID number, can be one-to-one converted from multiple digital phone numbers of a user, or numbers at the user's choice, or numbers assigned by the homepage system, or based on other rules. The homepage ID number is used as a basis for interaction, thereby improving the convenience of interaction between users.

Figure 1:
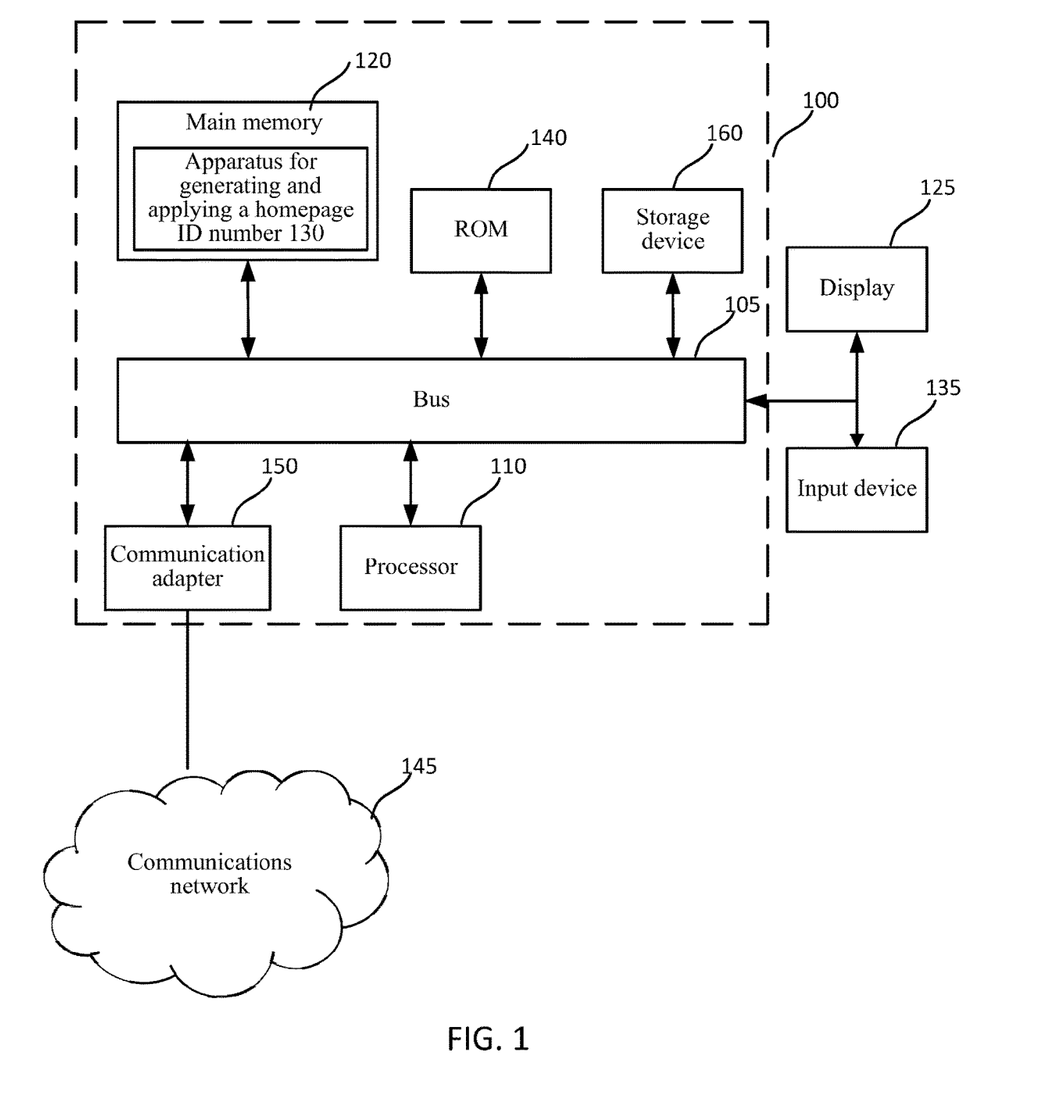
FIG. 1 is a structural block diagram of an electronic device according to one embodiment of the invention.

FIG. 1 shows schematically a structural block diagram of an electronic device 100 according to one embodiment of the invention. In the exemplary embodiment, the electronic device 100 includes a bus 105 or another communication component for communicating information, and a processor 110 that is coupled to the bus 105 and configured to process the information. The electronic device 100 further includes a main memory 120, such as random access memory (RAM) or another dynamic storage device, which is coupled to the bus 105 and configured to store the information and instructions to be executed by the processor 110, for example, an apparatus 130 for generating and applying a homepage ID number in this embodiment. The main memory 120 can be further configured to store location information, temporary variables, or other intermediate information during instruction execution of the processor 110. The electronic device 100 can further include a read-only memory (ROM) 140 or another static storage device that is coupled to the bus 105 and configured to store static information and instructions used for the processor 110. A storage device 160, such as a solid-state device, a magnetic disk, or an optical disc, is coupled to the bus 105 to store information and instructions permanently.

The electronic device 100 can be coupled to a display 125 (such as a liquid crystal display or an active matrix display) by using the bus 105, so as to display the information to a user. An input device 135 (such as a keyboard including alphanumeric keys and other keys) can be coupled to the bus 105, so as to communicate information and command selection to the processor 110. In another implementation, the input device 135 has a touch screen display. The input device 135 can include a cursor control (such as a mouse, a track ball, or a cursor direction key) configured to communicate direction information and command selection to the processor 110 and control cursor movement on the display 125.

In some implementations, the electronic device 100 can include a communication adapter 150 (such as a network adapter). The communication adapter 150 can be coupled to the bus 105 and can be configured to enable communication with a computing or communications network 145 and/or another computing system. In various illustrative implementations, the communication adapter 150 can be configured to implement any type of network configuration, for example, wired network configuration, wireless network configuration, pre-configuration, peer-to-peer, LAN, WAN, and so on.

According to various implementations, in response to the execution, by the processor 110, of the configuration of instructions in the main memory 120, for example, the apparatus 130 for generating and applying a homepage ID number in this embodiment, the process of the implementation described in the disclosure can be performed by a computing system. Such instructions can be read into the main memory 120 by using another computer readable medium (such as the storage device 160). The execution of the configuration of instructions in the main memory 120 enables the computing system to execute the illustrative process described in the disclosure. Further, one or more processors 110 in multiprocessing configurations can be employed to execute the instructions in the memory. In an alternative implementation, a hard-wired circuit can be used in replacement of the software instructions or in combination with the software instructions to achieve the implementation of the invention. Therefore, the implementation is not limited to any specific combination of hardware circuits and software.

Although an example of a processing system has been depicted in FIG. 1, the implementation and functional operations of the subject described in this specification can be implemented by using other types of digital electronic circuit systems, or in computer software, firmware or hardware (including the structure disclosed in this specification and structural equivalents thereof), or a combination of one or more of the computer software, firmware and hardware.

In one embodiment, the specific type of the electronic device 100 is not limited, which for example can be, but is not limited to, a device having a processing function, such as a smart phone, a personal computer (PC), a tablet computer, a personal digital assistant (PDA), a mobile internet device (MID), a web server, or a data server.

In another aspect, the invention also provides a non-transitory computer-readable storage medium storing programs and/or instruction codes. The programs and/or instruction codes, when executed by one or more processors, cause the following methods for generating and applying a homepage ID number to be performed.

Figure 2:
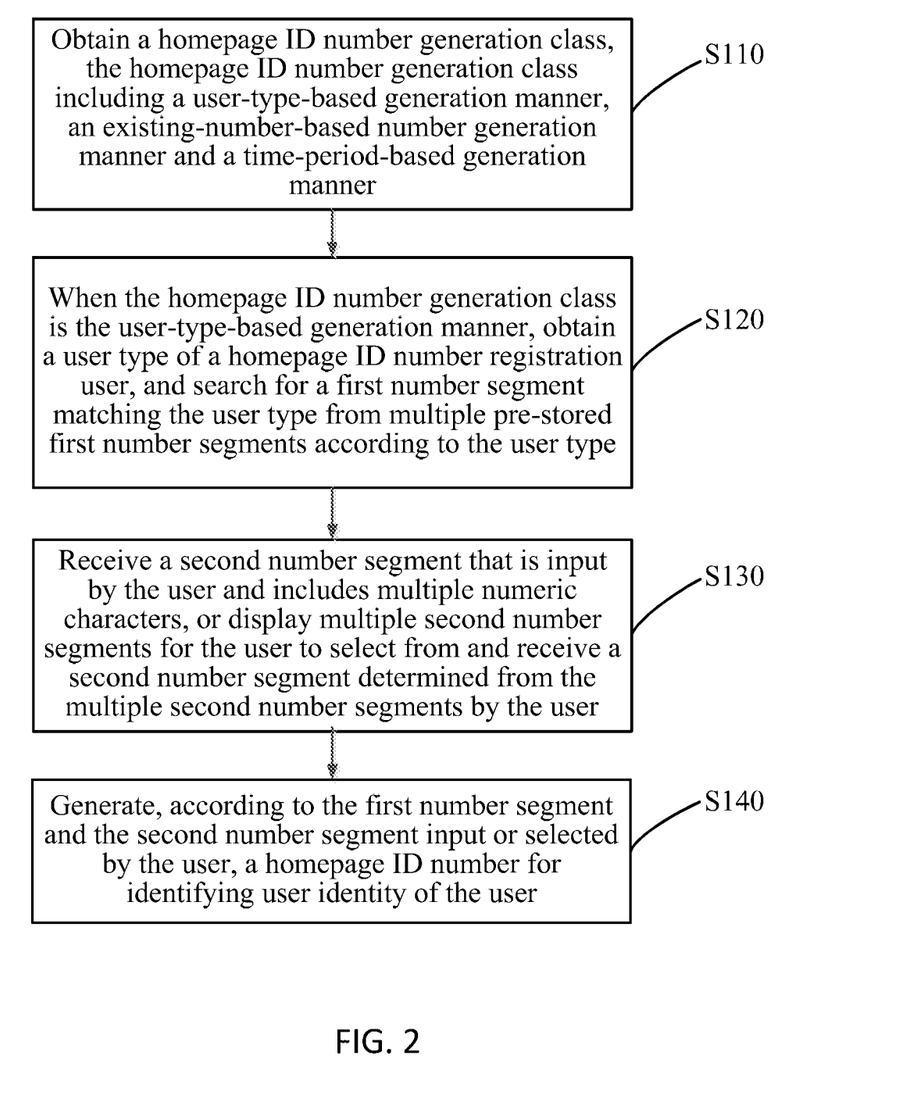
FIG. 2 is a flowchart of a method for generating and applying a homepage ID number according to one embodiment of the invention.

Referring to FIG. 2, a method for generating and applying a homepage ID number is shown according to one embodiment of the present invention, where the method can be applied to the foregoing electronic device 100. In the exemplary embodiment, the steps defined by the method are performed in the electronic device 100 and implemented by the processor 110, which are elaborated below in details.

Step S110: Obtain a homepage ID number generation class, the homepage ID number generation class including a user-type-based generation manner, an existing-number-based number generation manner and a time-period-based generation manner.

In this embodiment, a homepage ID number can be generated or assigned in many manners. A user can select a generation manner according to requirements. For example, an option of a homepage ID number generation class can be displayed in a registration interface. The homepage ID number generation class may include a user-type-based generation manner, an existing-number-based number generation manner, a time-period-based generation manner, and the like. In the user-type-based generation manner, users are mainly classified into three types, including public users, college graduate users and institutional users. In the existing-number-based number generation manner, an existing number may be a mobile phone number of a user. In the time-period-based generation manner, the system can provide different number groups for users in different time periods.

In this embodiment, homepage ID numbers obtained in the user-type-based generation manner and the time-period-based generation manner each include two parts. A homepage ID number includes multiple digits, for example, 12 or 13 digits. In this embodiment, it is configured that the homepage ID number includes 12 digits. The first part of the homepage ID number is a number group including four digits, and the second part a number group including eight digits.

Step S120: When the homepage ID number generation class is the user-type-based generation manner, obtain a user type of a homepage ID number registration user, and search for a first number segment matching the user type from multiple pre-stored first number segments according to the user type.

In this embodiment, if a user selects the user-type-based generation manner to generate a homepage ID number, a user type of the user can be obtained, and a first number segment matching the user type is searched for in multiple pre-stored first number segments according to the user type. For example, in this embodiment, three groups of first number segments whose first four digits are different can be defined in advance according to user types. For example, the first number segment, i.e., the first four digits, of a homepage ID number of an institutional user may be 4000; the first number segment, i.e., the first four digits of a homepage ID number of a college graduate user may be 2000; the first number segment, i.e., the first four digits of a homepage ID number of a public user may be 1000. As such, after a user type of a registration user is determined, a corresponding first number segment can be assigned to the user.

Figure 3:
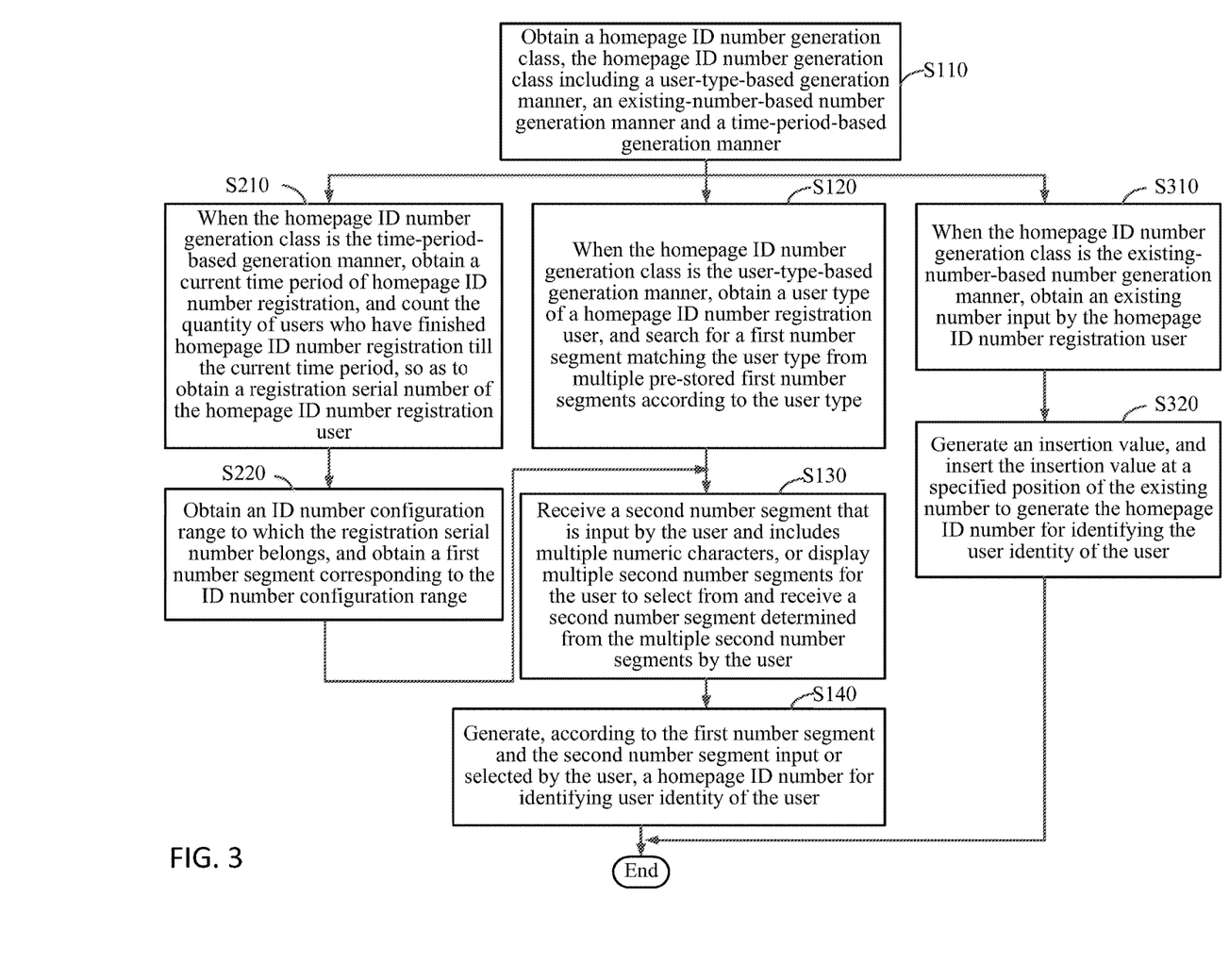
FIG. 3 is another flowchart of a method for generating and applying a homepage ID number according to one embodiment of the invention.

In an implementation of this embodiment, if the user selects the time-period-based generation manner to obtain a homepage ID number, the first number segment is determined in a different manner. In such a case, referring to FIG. 3, the method for generating and applying a homepage ID number may further include the following steps:

Step S210: When the homepage ID number generation class is the time-period-based generation manner, obtain a current time period of homepage ID number registration, and count the quantity of users who have finished homepage ID number registration till the current time period, so as to obtain a registration serial number of the homepage ID number registration user.

Step S220: Obtain an ID number configuration range to which the registration serial number belongs, and obtain a first number segment corresponding to the ID number configuration range.

When the time-period-based generation manner is selected, the system can assign an identical first number segment to users who register in a particular time period. For example, a first number segment of 1000 is assigned to the users when the total quantity of system registration users is less than 100,000,000. That is, multiple ID number configuration ranges can be pre-stored in the system. For example, when the quantity of registration users ranges from 1 to 100,000,000, the corresponding first number segment may be 1000; when the quantity of registration users ranges from 100,000,000 to 200,000,000, the corresponding first number segment may be 2000. In this embodiment, the setting of the specific value range is not limited, and the value range can be set according to a user requirement.

In this embodiment, during registration of a user, the current time period of the registration can be obtained, and the quantity of users who have finished homepage ID number registration till the current time period are counted, so as to obtain a registration serial number of the homepage ID number registration user. For example, if 5000 users have finished registration till the current time period, the registration serial number of the current user is 5001. An ID number configuration range to which the registration serial number of the user belongs is obtained, and a first number segment corresponding to the ID number configuration range is obtained. For example, the ID number configuration range to which 5001 belongs is a range of 1 to 100,000,000. In this case, the first number segment is 1000 according to the preset corresponding relationship.

Step S130: Receive a second number segment that is input by the user and includes multiple numeric characters, or display multiple second number segments for the user to select from and receive a second number segment determined from the multiple second number segments by the user.

Step S140: Generate, according to the first number segment and the second number segment input or selected by the user, a homepage ID number for identifying user identity of the user.

In this embodiment, the second part of the homepage ID number, that is, the second number segment, may include eight digits. The user can fill in the second part digit by digit in the registration interface according to his/her will, or the system may provide multiple second number segments for the user to select from.

Figure 4:
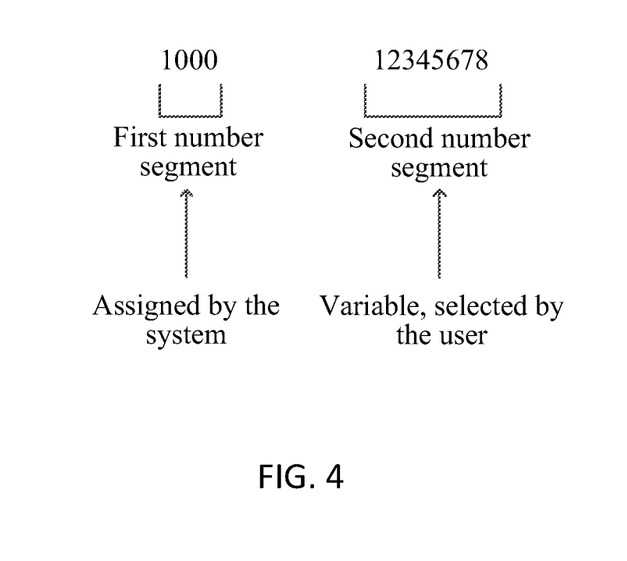
FIG. 4 is a schematic diagram of generating a homepage ID number according to one embodiment of the invention.

After receiving the second number segment input or selected by the user, the electronic device 100 combines the second number segment and the first number segment to obtain a homepage ID number, as shown in FIG. 4. In this embodiment, after each of the four digits in the first part is determined, there are up to 100,000,000 possible variations for the eight digits in the second part. Theoretically, the 8-digit number can support up to 100,000,000 registration users, and is sufficient to cover the population over a large area. In addition to the variations of the second part, the four digits in the first part have 10,000 possible combinations. Therefore, the combinations of the digits in the first part and the second part can provide 12-digit numbers for about 1,000 billion registration users, and therefore can cover the total population all over the world with high redundancy.

In this embodiment, different number groups for the second number segment can be assigned to different colleges. As such, when a homepage ID number is assigned to a college graduate user, a fixed first number segment, such as 2000, is set. Then, according to a graduation college of the college graduate user, a number group corresponding to the graduation college is found, and a second number segment is obtained from the number group. A homepage ID number of the college graduate user is obtained according to the first number segment and the second number segment.

In this embodiment, after registering the homepage ID number successfully and logging onto the system according to the homepage ID, the college graduate user can enter into an information flow, and at the same time, can automatically join in an alumni group of the graduation college corresponding to the number group to which the second number segment of the homepage ID number of the user belongs, so as to become a member of the alumni group. In another implementation of this embodiment, a public user can further choose to generate a homepage ID number based on an existing number. The existing number may be a mobile phone number. In such an embodiment, referring to FIG. 3 again, the method for generating and applying a homepage ID number further includes the following steps:

Step S310: When the homepage ID number generation class is the existing-number-based number generation manner, obtain an existing number input by the homepage ID number registration user.

Step S320: Generate an insertion value, and insert the insertion value at a specified position of the existing number to generate the homepage ID number for identifying the user identity of the user.

Figure 5:
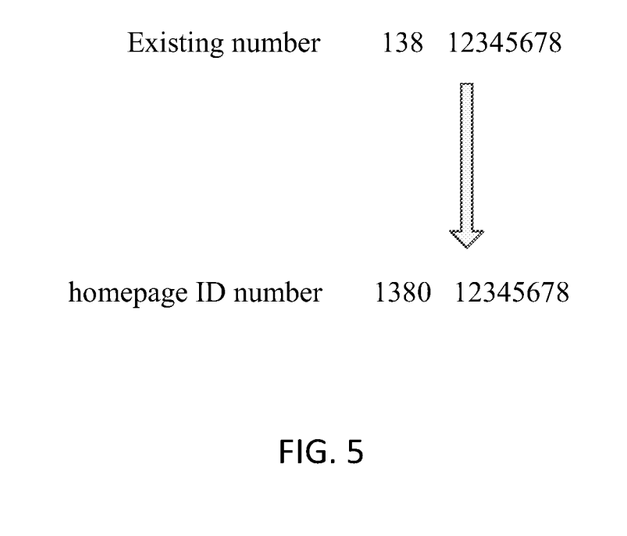
FIG. 5 is another schematic diagram of generating a homepage ID according to one embodiment of the invention.

When selecting the existing-number-based number generation manner, the user can input an existing number in the registration interface. The system can generate an insertion value. There can be one or more insertion values. The insertion value can be selected from a range of [0, 9]. The insertion value is inserted at a specified position of the obtained existing number to generate the homepage ID number for identifying the user identity of the user, for example, as shown in FIG. 5. The specified position can be any position in the existing number, that is, the insertion value can be inserted at any position in the existing number. There can be one or more specified positions. When there is one specified position and multiple insertion values, the multiple insertion values can be collectively inserted into the specified position. If there are multiple specified positions and multiple insertion values, the multiple insertion values can be inserted into the multiple specified positions in a distributive manner. In this embodiment, the quantity of insertion values, the quantity of specified positions, and an insertion manner are not specifically limited.

In this embodiment, because the first three digits of a mobile phone number generally represent a service operator and the fourth digit to the seventh digit are related to a region in a way, "0" can be added at the position between the third digit and the fourth digit of the mobile phone number, so that a coding rule of the mobile phone number is not affected. It should be noted that a digit of 1 to 9 other than 0 can also be inserted. The purpose of selecting "0" for insertion is to make the generated homepage ID number and the mobile phone number have a correlation that is easier to recognize.

In this embodiment, in the manner of generating a homepage ID number based on an existing number, it convenient and practical to convert a mobile phone number into a corresponding 12-digit number for users who want to bind mobile phone numbers to a social network or a communications system. These users do not need to memorize extra numbers. Moreover, because a message authentication code can be received without extra preparation, unnecessary anxiety can be avoided during password resetting or authentication. In addition, converting a mobile phone number into a 12-digit number of a user simplifies a registration process in a social network or a collective communications system, and especially, significantly facilitates registration of smart phone users.

In this embodiment, homepage ID numbers can be classified into free-registration numbers and paid-registration numbers. Some homepage ID numbers with special meanings are assigned based on payment, whereas other homepage ID numbers can be assigned for free. Paid homepage ID numbers can include corresponding valid birthday digits in a proper age range. For example, the 8-digit variable part of the number is 19830621 (year/month/day), or 11082002 (month/day/year), or the like. Particularly, numbers of paying users may be numbers including numeric strings that are generally considered as good or lucky. These numeric strings have positive, valuable, interesting or healthy meanings, or are easy to recognize or memorize. In such numeric strings, multiple identical digits such as 6666 and 888, alternating digits such as 5858 and 2233, or the like appear in a row. These "good" numbers are generally accepted by the public. People choose these numbers not only for the personal convenience or wealth, but also for improving the commercial image, marketing, and status. Therefore, people are willing to pay for these numbers. People are willing to pay a higher price for numbers sound better or look special, and the buyer may be considered more distinguished.

Therefore, based on the foregoing consideration, a class of particular number segments that require payment may be pre-stored in the electronic device 100. After receiving the second number segment selected or input by the user, the electronic device 100 can detect whether the second number segment selected or input by the user matches a pre-stored particular number segment. For example, if the second number segment input by the user includes a continuous number "8888" and the continuous number is a preset particular number segment that requires payment, fee information needs to be obtained according to the second number segment. In this embodiment, different fee amounts may be set for different particular number segments, and the fee amount corresponding to the second number segment is displayed on the registration interface to inform the user. If the user determines to pay the fee to buy the second number segment, payment can be completed on a payment interface. After detecting and determining that the user completes a payment operation according to the fee information, the electronic device then combines the first number segment previously assigned to the user and the second number segment obtained after the payment to form a homepage ID number, and assigns the homepage ID number to the user.

In this embodiment, for public users and college graduate users, one user is generally assigned with one homepage ID number. For institutional users, because the institutional users are in an institution system having a tree-like structure in this embodiment, the tree-like structure can map administrative authority between users in the institution system. An upper-level node in the tree-like structure has administrative authority on a lower-level node, and when a particular requirement is met, an upper-level node can create one or more lower-level nodes. The particular requirement is that when an upper-level node has one or more homepage ID numbers, the upper-level node has the right to create a lower-level node.

Therefore, in this embodiment, assignment of a homepage ID number to an institutional user can be implemented through the following process:

In this embodiment, if the right of creating a lower-level node needs to be granted to an institutional user registering a homepage ID number, after a homepage ID number for identifying user identity of the user is generated, an ID number group including at least the homepage ID number is obtained. For example, if the generated homepage ID number is "400000000001", an ID number group "4000 0000 0001-4000 0000 0100" which starts with the homepage ID number and includes 100 homepage IDs can be obtained. Moreover, the ID number group is assigned to the institutional user. The institutional user uses the first homepage ID number in the ID number group, that is, 4000 0000 0001, as the ID thereof, and the remaining homepage ID number can be assigned to lower-level nodes of the user.

When creating a subordinate user based on the tree-like structure, the institutional user can determine a to-be-assigned homepage ID number from multiple homepage ID numbers in the obtained ID number group according to a preset rule, and assign the to-be-assigned homepage ID number to the created subordinate user. The preset rule may be searching for the minimum homepage ID number in the remaining homepage ID numbers after the assignment, and assigning the minimum homepage ID number to the newly created lower-level node, or searching for the maximum homepage ID number in the remaining homepage ID numbers after the assignment, and assigning the maximum homepage ID number to the newly created lower-level node. In this embodiment, a specific assignment rule is not limited, and can be set according to an actual requirement.

In addition, in this embodiment, e-mail information of the user can be further obtained based on the generated homepage ID number, so as to provide a basis for interaction between users. In one embodiment, the electronic device 100 can generate an e-mail address according to the generated homepage ID number and preset domain name information, and assign the generated e-mail address to the user. In this case, the generated e-mail address includes a 12-digit homepage ID number and the preset domain name information, such as gcall.com, and a numeric e-mail address, such as 400012345678@gcall.com, is obtained.

Figure 6:
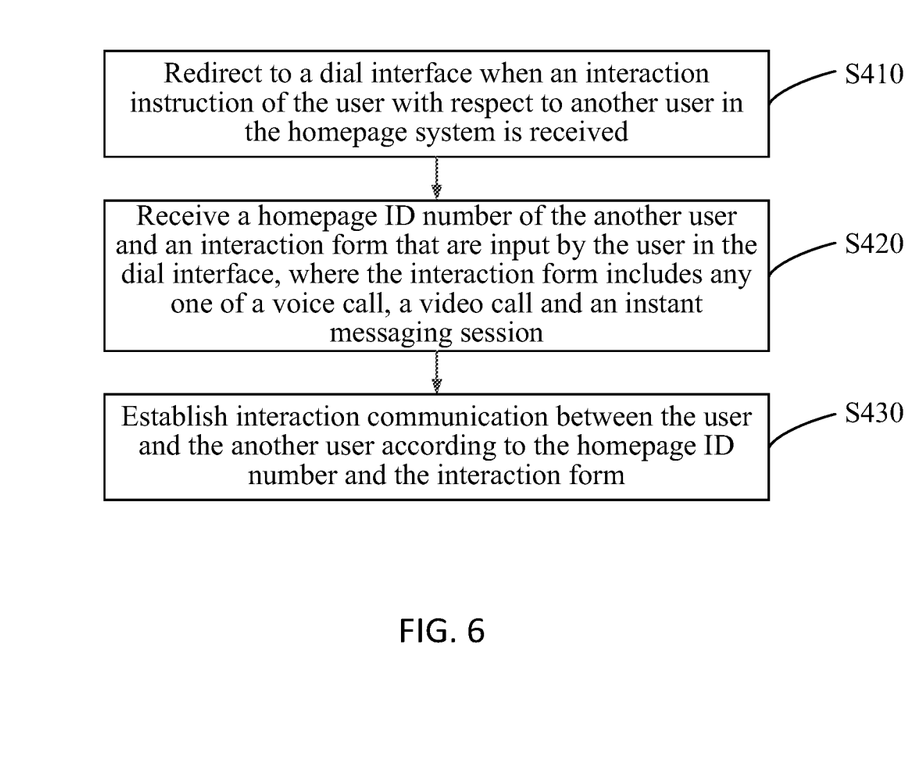
FIG. 6 is another flowchart of a method for generating and applying a homepage ID number according to one embodiment of the invention.

In this embodiment, the homepage ID number can be used as a basis for interaction between users in the homepage system, and as an identifier for user identification and user logon. Referring to FIG. 6, in this embodiment, the method for generating and applying a homepage ID number further includes the following steps:

Step S410: Redirect to a dial interface when an interaction instruction of the user with respect to another user in the homepage system is received.

Step S420: Receive a homepage ID number of the another user and an interaction form that are input by the user in the dial interface, where the interaction form includes any one of a voice call, a video call and an instant messaging session.

Step S430: Establish interaction communication between the user and the another user according to the homepage ID number and the interaction form.

When the user needs to establish communication with another user to implement information or data interaction, the user may input a homepage ID number of the another user on the dial interface to trigger interaction. Moreover, an interaction form, such as voice call, video call, or instant-messaging session, can further be selected on the dial interface.

In this embodiment, when an institutional user sends a voice call or video call interaction request, the institutional user only needs to input the last four digits of the 12-digit number when making a voice/video call to a user in the same institution. The institutional user only needs to input the last eight digits of the 12-digit number when making a voice/video call to a user of another institution. The institutional user needs to input the whole 12-digit number when making a voice/video call to a public user/college graduate user.

In addition, the user can further save homepage ID numbers of other users in an address book. Searching, adding, and other functions can be implemented in the address book. Moreover, the user can also view his/her own homepage ID number in the address book. The user can find a homepage ID number of another user that the user wants to interact with, so as to implement a dialing function. Besides, the homepage ID number of the other party of the call can also be displayed in the address book. The user can enter a detail page by clicking an icon, such as "i", on the right of the latest call record. The 12-digit homepage ID number of the other party can be displayed in the detail page. The user can send an interaction call request by clicking the 12-digit homepage ID number.

After receiving the homepage ID number and the interaction form, the electronic device 100 can establish interaction communication between the user and the other user according to the homepage ID number and the interaction form, so as to implement a video call, voice call or instant-messaging session between the two users.

In addition, a function of sending and receiving e-mails between users can further be implemented according to the generated digital e-mail address. In an outbox page, an email address denoted by the 12-digit number can be input as a recipient. The system finds a user on the system by means of matching according to the 12-digit number or the e-mail address denoted by the 12-digit number. When sending an e-mail, the user inputs the e-mail address denoted by the 12-digit number in a recipient bar and sends the e-mail to the recipient. The e-mail is received in an e-mail receiving list of the inbox of the recipient. In the inbox of the recipient whose e-mail address is the 12-digit number, the user views the received e-mail, and the recipient is displayed as the e-mail address denoted by the 12-digit number.

Figure 7:
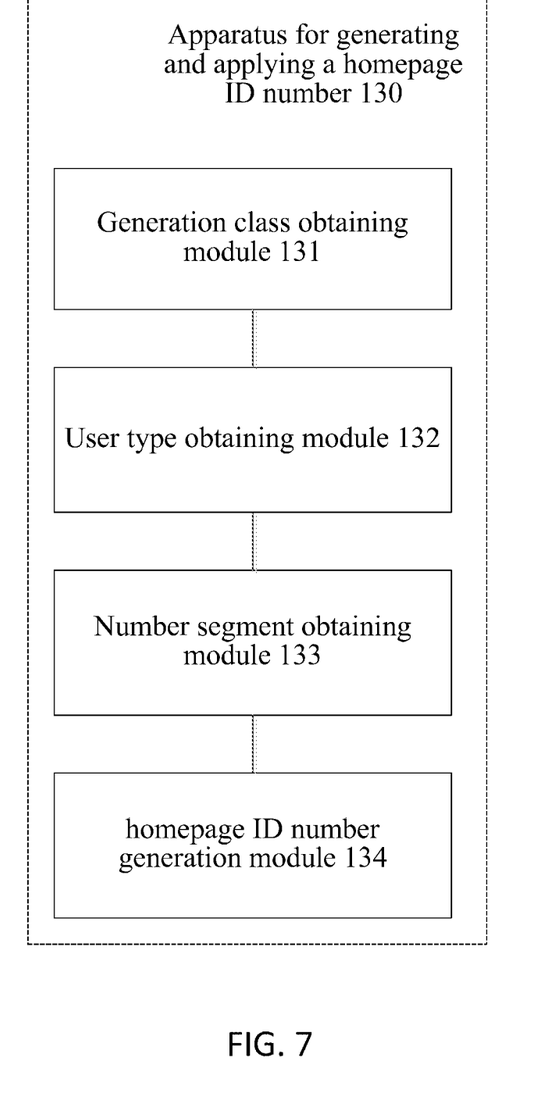
FIG. 7 is a block diagram of functional modules of an apparatus for generating and applying a homepage ID number according to one embodiment of the invention.

Referring to FIG. 7, an apparatus 130 for generating and applying a homepage ID number is shown according to one embodiment of the present invention. The apparatus 130 is applied to an electronic device 100 including an interaction platform. The interaction platform includes a homepage system. The homepage ID number is used for identifying user identity of a user in the homepage system. The apparatus 130 for generating and applying a homepage ID number includes a generation class obtaining module 131, a user type obtaining module 132, a number segment obtaining module 133 and a homepage ID number generation module 134.

The generation class obtaining module 131 is configured to obtain a homepage ID number generation class, the homepage ID number generation class including a user-type-based generation manner, an existing-number-based number generation manner and a time-period-based generation manner.

In this embodiment, the generation class obtaining module 131 is configured to perform step S110 shown in FIG. 2. For specific description about the generation class obtaining module 131, refer to the description of step S110 shown in FIG. 2.

The user type obtaining module 132 is configured to: when the homepage ID number generation class is the user-type-based generation manner, obtain a user type of a homepage ID number registration user, and search for a first number segment matching the user type from multiple pre-stored first number segments according to the user type.

In this embodiment, the user type obtaining module 132 is configured to perform step S120 shown in FIG. 2. For specific description about the user type obtaining module 132, refer to the description of step S120 shown in FIG. 2.

The number segment obtaining module 133 is configured to receive a second number segment that is input by the user and comprises multiple numeric characters, or display multiple second number segments for the user to select from and receive a second number segment determined from the multiple second number segments by the user.

In this embodiment, the number segment obtaining module 133 is configured to perform step S130 shown in FIG. 2. For specific description about the number segment obtaining module 133, refer to the description of step S130 shown in FIG. 2.

The homepage ID number generation module 134 is configured to generate, according to the first number segment and the second number segment input or selected by the user, a homepage ID number for identifying user identity of the user.

In this embodiment, the homepage ID number generation module 134 is configured to perform step S140 shown in FIG. 2. For specific description about the homepage ID number generation module 134, refer to the description of step S140 shown in FIG. 2.

One skilled in the art can clearly understood that in order to make the description convenient and concise, for a specific working process of the apparatus described above, refer to the corresponding process in the foregoing method. Details are not repeated herein again.

In conclusion, in the method and apparatus for generating and applying a homepage ID number provided in the embodiments of the invention, a homepage ID number generation class is obtained; when the homepage ID number generation class is a user-type-based generation manner, a user type of a homepage ID number registration user is obtained, and a corresponding first number segment is searched for in multiple pre-stored first number segments according to the user type. Then a second number segment is obtained according to information input or selected by the user; a homepage ID number for identifying user identity of the user in the homepage system is generated according to the first number segment and the second number segment. The solution for generating and applying a homepage ID number provides a homepage ID number that can identify user identity of a user, and the homepage ID number is used as a basis for interaction between users in the homepage system, so that the interaction in the platform is more convenient.

It should be appreciated that the disclosed apparatus and method may also be implemented in other manners. The embodiments of the apparatus and method described above are merely illustrative, but are not intended to limit the invention. For example, the flowchart and block diagram in the accompanying drawings show system architecture, functions and operations that are possibly implemented by the apparatus, method and computer program product according to the embodiments of the present invention. In this regard, each block in the flowchart or block diagram can represent a module, a program segment, or a part of code. The module, program segment or a part of code includes one or more executable instructions for implementing a specified function. It should also be noted that in some alternative implementations, functions indicated in the blocks can also take place in a sequence different from the sequence indicated in the drawing. For example, two successive blocks actually can be executed in a substantially parallel manner, or can be executed in a reverse sequence, which depends on the related functions. It should also be noted that each block in the block diagram and/or flowchart and a combination of blocks in the block diagram and/or flowchart can be implemented by using a dedicated hardware-based system for executing specified functions or actions, or can be implemented by a combination of dedicated hardware and computer instructions.

In addition, the functional modules in the embodiments of the present invention can be integrated together to form an independent part, or each functional module can exist alone, or two or more modules can be integrated to form an independent part.

When the function is implemented in the form of a software functional module and sold or used as an independent product, the function may be stored in a computer-readable storage medium. Based on such an understanding, the technical solution of the present invention essentially, or the part contributing to the prior art, or all or some of the technical solution may be embodied in the form of a software product. The computer software product is stored in a storage medium and includes several instructions for instructing a computer device (which may be a personal computer, an electronic device 10, a network device, or the like) to perform all or some of the steps of the methods described in the embodiments of the present invention. The foregoing storage medium includes: various media that can store program code, such as a USB flash disk, a mobile hard disk drive, a read-only memory (ROM), a random access memory (RAM), a magnetic disk, or an optical disc.

The foregoing descriptions are merely preferred embodiments of the present invention, but are not intended to limit the present disclosure. For a person skilled in the art, the present invention can have various modifications and changes. Any modification, equivalent replacement, or improvement made within the spirit and principle of the present disclosure shall fall within the protection scope of the present invention.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

What is claimed is:

1. A method for generating and applying a homepage identification (ID) number used as user identification of a user in a homepage system, operably applied to an electronic device comprising an interaction platform including the homepage system, wherein multiple ID number configuration ranges are pre-stored in the electronic device, the method comprising:
obtaining a homepage ID number generation class, the homepage ID number generation class comprising a user-type-based generation manner, an existing-number-based number generation manner and a time-period-based generation manner;
when the homepage ID number generation class is the user-type-based generation manner, obtaining a user type of a homepage ID number registration user, and searching for a first number segment matching the user type from multiple pre-stored first number segments according to the user type;
when the homepage ID number generation class is the time-period-based generation manner, obtaining a current time period of homepage ID number registration, and counting the quantity of users who have finished the homepage ID number registration till the current time period, so as to obtain a registration serial number of the homepage ID number registration user; and obtaining an ID number configuration range to which the registration serial number belongs, and obtaining the first number segment corresponding to the ID number configuration range;
receiving a second number segment that is input by the user and comprises multiple numeric characters, or displaying multiple second number segments for the user to select from and receiving a second number segment determined from the multiple second number segments by the user; and
generating, according to the first number segment and the second number segment input or selected by the user, a homepage ID number for identifying user identity of the user.

2. The method according to claim 1, further comprising:
when the homepage ID number generation class is the existing-number-based number generation manner, obtaining an existing number input by the homepage ID number registration user; and
generating an insertion value, and inserting the insertion value at a specified position of the existing number to generate the homepage ID number for identifying the user identity of the user.

3. The method f according to claim 2, wherein the insertion value comprises multiple digits, and the step of inserting the insertion value at a specified position of the existing number to generate the homepage ID number for identifying the user identity of the user comprises:
setting one or more specified positions in the obtained existing number;
when there is one specified position, inserting all the digits of the insertion value into the specified position; and when there are multiple specified positions, inserting the digits of the insertion value into the multiple specified positions in a distributive manner.

4. The method according to claim 1, wherein the user type comprises a public user type, a college graduate user type, and an institutional user type, and when the user type is the institutional user type and the user is in a user institution of a tree-like structure, the method further comprises:
   obtaining, according to the generated homepage ID number, an ID number group at least comprising the homepage ID number; and
   assigning the ID number group to the user.

5. The method according to claim 4, wherein when the ID number group owned by the user comprises multiple homepage ID numbers, the method further comprises:
   creating a subordinate user of the user based on the tree-like structure; and
   determining a to-be-assigned homepage ID number from the multiple homepage ID numbers in the ID number group according to a preset rule, and assigning the to-be-assigned homepage ID number to the created subordinate user.

6. The method according to claim 1, wherein before the step of generating, according to the first number segment and the second number segment input or selected by the user, a homepage ID number for identifying user identity of the user, the method further comprises:
   detecting whether the second number segment input or selected by the user matches a preset particular number segment;
   if yes, obtaining fee information according to the second number segment and displaying the fee information; and
   after determining that the user completes a payment operation according to the fee information, performing the step of generating, according to the first number segment and the second number segment input or selected by the user, a homepage ID number for identifying user identity of the user.

7. The method according to claim 1, wherein after the step of generating, according to the first number segment and the second number segment input or selected by the user, a homepage ID number for identifying user identity of the user, the method further comprises:
   generating an e-mail address of the user according to the generated homepage ID number and preset domain name information, and assigning the generated e-mail address to the user.

8. The method according to claim 1, wherein the homepage system comprises multiple users, and the method further comprises:
   redirecting to a dial interface when an interaction instruction of the user with respect to another user in the homepage system is received;
   receiving a homepage ID number of the another user and an interaction form that are input by the user in the dial interface, wherein the interaction form comprises any one of a voice call, a video call and an instant messaging session; and
   establishing interaction communication between the user and the another user according to the homepage ID number and the interaction form.

9. A method for generating and applying a homepage identification (ID) number used as user identification of a user in a homepage system, operably applied to an electronic device comprising an interaction platform including the homepage system, the method comprising:
   obtaining a homepage ID number generation class, the homepage ID number generation class comprising a user-type-based generation manner, an existing-number-based number generation manner and a time-period-based generation manner;
   when the homepage ID number generation class is the user-type-based generation manner, obtaining a user type of a homepage ID number registration user, and searching for a first number segment matching the user type from multiple pre-stored first number segments according to the user type;
   receiving a second number segment that is input by the user and comprises multiple numeric characters, or displaying multiple second number segments for the user to select from and receiving a second number segment determined from the multiple second number segments by the user; and
   generating, according to the first number segment and the second number segment input or selected by the user, a homepage ID number for identifying user identity of the user;
   when the homepage ID number generation class is the existing-number-based number generation manner, obtaining an existing number input by the homepage ID number registration user; and
   generating an insertion value, and inserting the insertion value at a specified position of the existing number to generate the homepage ID number for identifying the user identity of the user,
   wherein the insertion value comprises multiple digits, and the step of inserting the insertion value at a specified position of the existing number to generate the homepage ID number for identifying the user identity of the user comprises:
   setting one or more specified positions in the obtained existing number;
   when there is one specified position, inserting all the digits of the insertion value into the specified position; and
   when there are multiple specified positions, inserting the digits of the insertion value into the multiple specified positions in a distributive manner.

10. A method for generating and applying a homepage identification (ID) number used as user identification of a user in a homepage system, operably applied to an electronic device comprising an interaction platform including the homepage system, the method comprising:
   obtaining a homepage ID number generation class, the homepage ID number generation class comprising a user-type-based generation manner, an existing-number-based number generation manner and a time-period-based generation manner;
   when the homepage ID number generation class is the user-type-based generation manner, obtaining a user type of a homepage ID number registration user, and searching for a first number segment matching the user type from multiple pre-stored first number segments according to the user type;
   receiving a second number segment that is input by the user and comprises multiple numeric characters, or displaying multiple second number segments for the user to select from and receiving a second number segment determined from the multiple second number segments by the user; and generating, according to the first number segment and the second number segment input or selected by the user, a homepage ID number for identifying user identity of the user; and generating an e-mail address of the user according to the generated homepage ID number and preset domain name information, and assigning the generated e-mail address to the user.

* * * * *